United States Patent [19]

Laird

[11] Patent Number: 4,955,765

[45] Date of Patent: Sep. 11, 1990

[54] MACHINE TOOL TABLE HAVING DISPOSABLE WOODEN TABLE SECTION MECHANISM

[76] Inventor: Ronald C. Laird, 405 Picone Dr., Harahan, La. 70123

[21] Appl. No.: 389,311

[22] Filed: Aug. 2, 1989

[51] Int. Cl.$^5$ .............................................. B23Q 3/10
[52] U.S. Cl. ......................................... 408/87; 108/90; 144/92; 144/286 A; 408/241 R; 409/219
[58] Field of Search .................. 408/1 R, 87, 91, 234, 408/241 R, 108; 83/471.3, 473, 486.1; 144/92, 286 R, 286 A; 409/219; 29/560, 560.1; 108/90

[56] References Cited

U.S. PATENT DOCUMENTS

| 1,735,478 | 11/1929 | Stubbs | 409/219 X |
| 2,034,194 | 3/1936 | Knoernschild | 408/87 X |
| 2,621,686 | 12/1952 | Tomkins | 144/92 |
| 3,554,140 | 1/1971 | Homesberger | 108/90 |
| 4,269,549 | 5/1981 | Block | 408/87 X |

Primary Examiner—Steven C. Bishop

[57] ABSTRACT

A machine tool table for supporting a workpiece beneath a cutting tool during operations requiring that the cutting tool pass completely through the workpiece and into the table.

9 Claims, 3 Drawing Sheets

MACHINE TOOL TABLE HAVING DISPOSABLE WOODEN TABLE SECTION MECHANISM

BACKGROUND OF THE INVENTION

The object of this invention is a machine tool table to be used in operations requiring a cutting tool to pass completely through a workpiece. The invention is particularly adapted for woodworking on a drill press.

A conventional drill press table is generally constructed entirely of cast metal. Typically, a small hole is provided in the center of the table to allow a cutting tool, such as a drill or bit, to pass through a workpiece without striking the metal work table. Aligning the cutting tool over this small hole can be an onerous task. This is especially true when using tools approaching the size of the hole in the table. As tool size equals or exceeds the size of the hole in the table, a backup drillable material must be secured to the work table to prevent damage to the tool as it passes through the workpiece. Leaving this backup material unsecured can be dangerous to the operator as the backup material could rotate causing injury.

Additionally, the backup drillable material is used in woodworking as a support for the underside of the workpiece to prevent splintering as the cutting tool passes through the workpiece. To properly support the workpiece against splintering, the material should be replaced as it becomes worn through repeated borings or whenever the size of the desired hole to be bored is smaller than the present hole in the backup material. Replacing the backup material used for this purpose can be time consuming if the material has been properly secured to the drill table.

Most woodworking users, therefore, would find it desireable to have a machine tool table for a drill press which would support a backup drillable material, such as a piece of scrap wood, without having to clamp or otherwise secure the backup material to the table to counteract the forces of a tool.

SUMMARY OF THE INVENTION

This invention provides a machine tool table having a disposable wooden table section mechanism which will allow an operator to quickly replace the backup material used on a drill press table for operations requiring a cutting tool to pass completely through a workpiece. The disposable wooden table section mechanism is adjustable to form a variable width groove to accept standard common-sized scrap wood or other scrap drillable material as the backup disposable wooden table section material. Once positioned in the groove, the disposable wooden table section material need only be moved forward and backward, or turned over to provide an unused section for different cutting tool sizes. When the disposable wooden table section material becomes unusable, a fresh backup material can be quickly and easily placed into the groove in the drill table.

The invention has other advantages which will become apparent from the following description and accompanying drawings.

DETAILED DESCRIPTION OF THE PREFERRED EMBODIMENT

Figure 1:
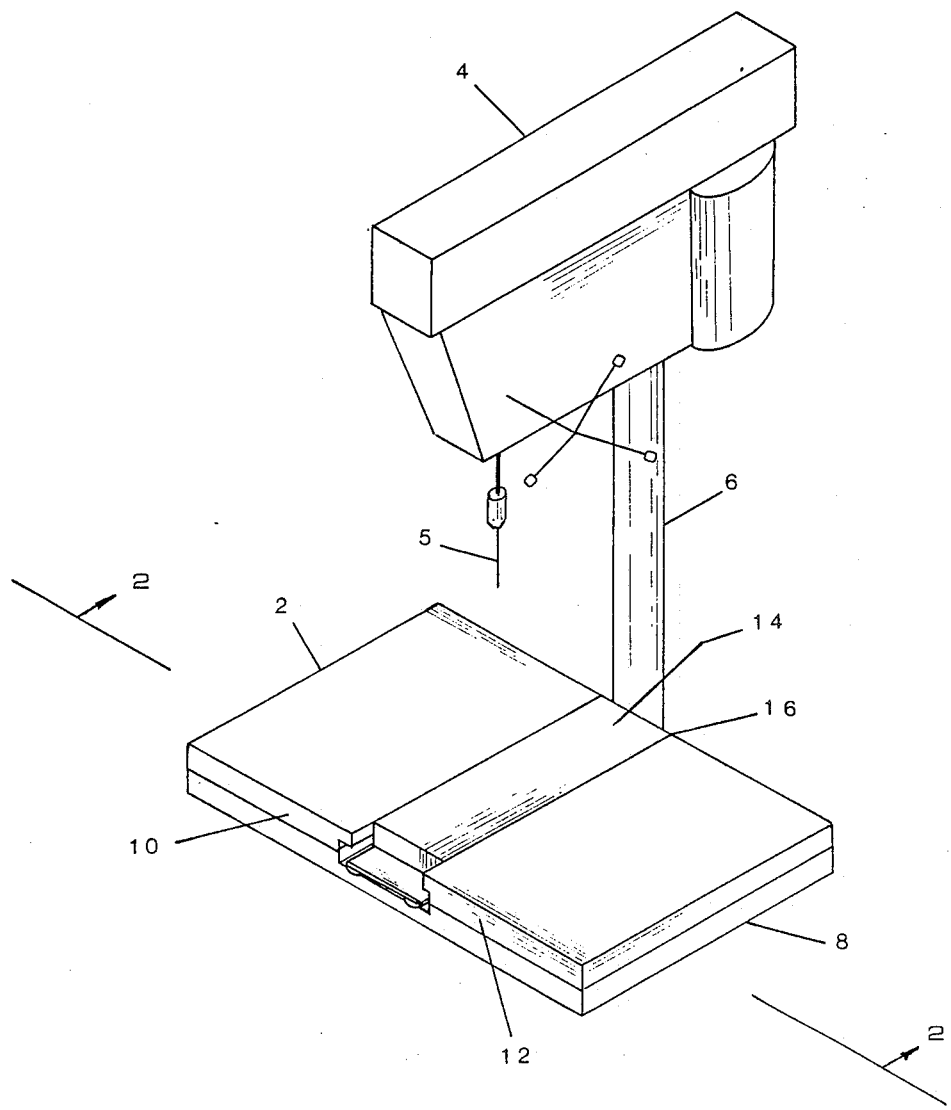
FIG. 1 is an isometric view of the invention being used on a drill press.

Referring to the drawings, FIG. 1 shows a machine tool table having a disposable wooden table section mechanism 2 mounted on a conventional drill press 4. The table 2 includes a supporting structure 8, which in this preferred embodiment rests on the conventional drill press table support bracket (not shown) which is connected to the drill press column 6. The support bracket will allow the table 2 to be moved in all directions relative to the column 6. The bracket will also allow for easily removing the table 2 of the preferred embodiment and replacing it with the standard drill press table for use in metalworking and other operations. The operation and connecting means of the support bracket are familiar to one skilled in the operations of a conventional drill press.

In the embodiment illustrated at FIG. 1, the table 2 is comprised of several portions which are preferably made of cast metal for rigidity. These portions are the left table wing 10 and the right table wing 12, each measuring 1½ by 10 by 16 inches and the supporting structure 8, measuring 1½ by 16 by 23½ inches. The left table wing 10 and the right table wing 12 are attached to the supporting structure 8 (See FIGS. 3 and 4) in any number of ways which will allow them to be positioned relative to one another to form a groove 16 between them. The groove 16 is adjustable in width from 3⅜ to 5⅝ inches to accommodate common lumber, such as 1½ by 3½ inch and 1½ by 5½ inch scraps, and is positioned beneath the drill bit 5. A disposable wooden table section 14 placed into the groove 16 formed between the table wings 10 and 12 completes the upper surface of the table 2. The disposable wooden table section 14 is preferably made of wood whereby it can be easily bored by woodworking bits which have passed through a workpiece and into the disposable wooden table section 14. The disposable wooden table section 14 should be 3½ inches to 5½ inches wide and up to 1½ inches thick. It can be any convenient length to suit the workpiece and table 2. In FIG. 1, the disposable wooden table section 14 is shown slightly shorter than the table 2 so that the leveling means can be seen in this view. The disposable wooden table section 14 is resting on the leveling means which are detailed at FIG. 2. The leveling means will level the upper surface of the disposable wooden table section 14 flush with the upper surfaces of the table wings 10 and 12 to provide a flat unobstructed surface to the workpiece.

Figure 2:
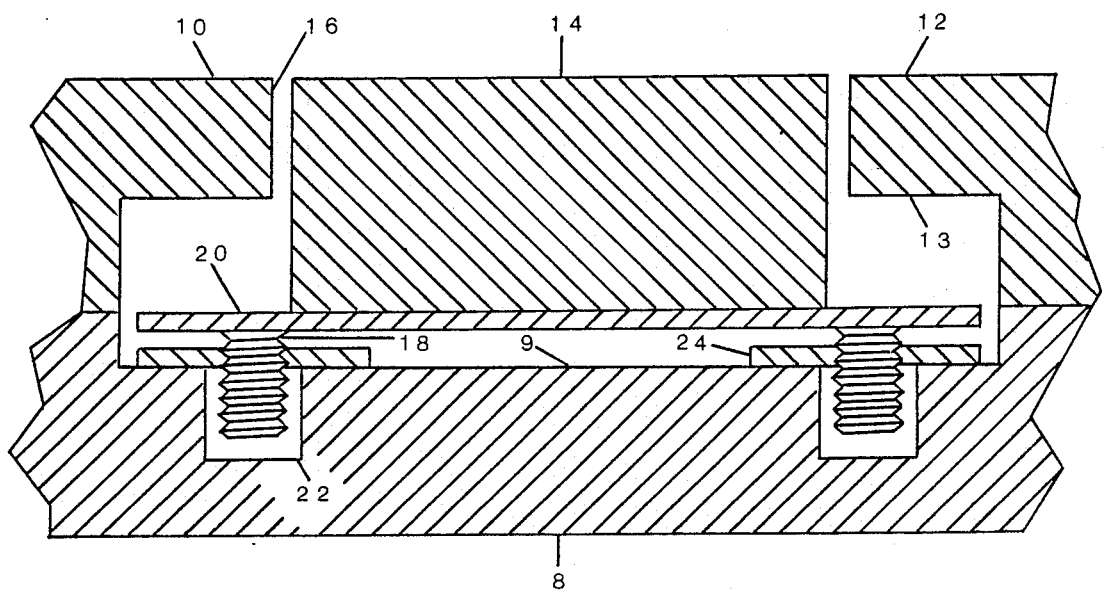
FIG. 2 is a partial front sectional view of the invention taken along Line 2—2 of FIG. 1 showing the disposable wooden table section material resting on the leveling means.

FIG. 2 shows a sectional view of the preferred embodiment of the leveling means within the groove 16 formed between the table wings 10 and 12. At the bottom of the groove 16 is a dado 9 in the supporting structure 8. The dado 9 measures ⅜ by 5¾ by 16 inches. The dado 9 has four ⅜ by ⅜ inch holes 22 (only two are shown) in its lower surface. Positioned within the four holes 22 are four ½ by ¾ inch leveling bolts 18 (only two are shown) welded at the top to a metal plate 20. The metal plate 20 measures ½ by 5½ by 16 inches. Four 1½ inch plastic threaded knobs 24 (only two are shown) fit the leveling bolts 18 and rest upon the dado 9. The disposable wooden table section 14 which is resting on the metal plate 20 is then raised and lowered by rotating the threaded knobs 24 about the bolts 18. To provide clearance for the metal plate 20, the table wings 10 and 12 each have a 1 by ¾ by 16 inch edge rabbet 13 on the lower edge within the groove 16.

Figure 3:
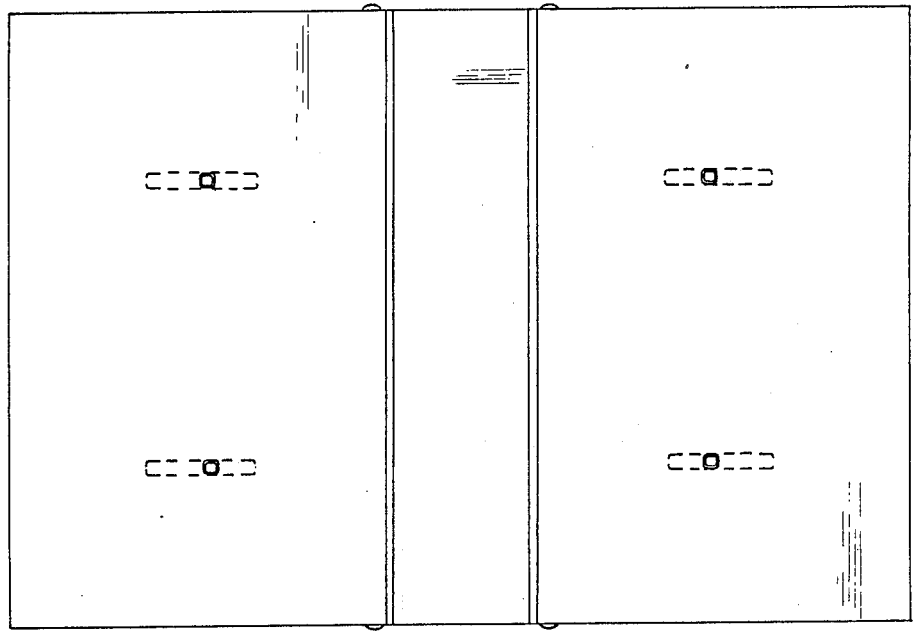
FIG. 3 is a plan view of the top of the invention showing the adjusting means.
Figure 4:
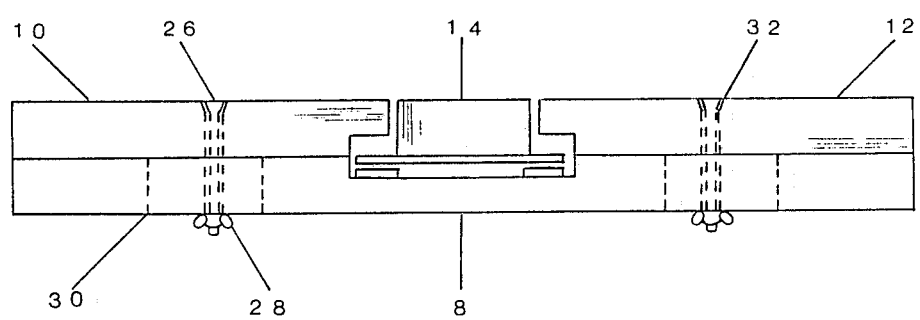
FIG. 4 is a plan view of the front of the invention showing the adjusting means.

In the embodiment of the attaching means illustrated at FIGS. 3 and 4, four ⅜ by 3½ inch attaching bolts 26 pass through holes 32 in the right and left table wings 10 and 12 and into three inch long slots 30 in the supporting structure 8. Wing nuts 28 fitted to the attaching bolts 26 can then be tightened to secure the table wings 10 and 12 in the proper position to accommodate the disposable wooden table section 14.

The invention provides a relatively quick and easy means for a drill press operator to replace and secure the backup material used in woodworking. The operator unloosens the four wing nuts 28 threaded to the attaching bolts 26 which secure the right and left table wings 10 and 12 to the supporting structure 8. The table wings 10 and 12 are then moved horizontally towards or away from each other to a distance equal to slightly larger than the available backup material to form a groove 16 between the table wings 10 and 12. The operator places the disposable wooden table section 14 into the groove 16 upon the metal plate 20. Knobs 24 are rotated about the leveling bolts 18 to level the disposable wooden table inset 14 flush with the table wings 10 and 12. The disposable wooden table section 14 is left slightly loose in the groove 16 so that the operator merely slides the disposable wooden table section 14 towards or away from the drill press 4 or turns it over to expose a fresh surface beneath the workpiece.

It should be noted that my intention is that the above description of the preferred embodiment should be considered as one exemplary embodiment and not as a limitation on the scope of the invention. Many changes, modifications and substitutions are possible. For example, the sizes and materials specified for the various components could be changed. The direction of the groove in the table could be changed to a diagonal or other position. The shape of the groove could be changed to a variety of depression shapes. The invention could be attached directly to the drill press column or to the standard drill press table instead of the support bracket as illustrated. Also, either one or both of the leveling and adjusting methods described could be changed or left off of the embodiment illustrated without departing from the spirit and scope of the invention. The invention could also be used on tools other than the drill press by changing the position, size and direction of the disposable wooden table section mechanism. One such tool is the radial arm saw. In this example, the groove for the disposable wooden table section material would be made larger and positioned parallel to the saw fence. The operator would move the disposable wooden table section material right and left across the table to expose a fresh surface to the saw blade. Accordingly, the scope of the invention should be determined by the following claims and not by the embodiments illustrated.

I claim:

1. A machine tool table, comprising:
   a supporting structure;
   a first table wing;
   a second table wing;
   a disposable wooden table section, said disposable wooden table section being unattached so that it is freely moveable by an operator, comprised of common lumber; and
   attaching means for attaching said first table wing and said second table wing upon said supporting structure so spaced to allow said disposable wooden table section to be positioned loosely upon said supporting structure between the table wings whereby the table wings can thereby counteract the forces of a tool upon said disposable wooden table section while permitting the disposable table section to be easily moved or replaced by an operator as needed to compensate for wear and use of different tools upon the table section.

2. The machine tool table of claim 1 wherein the space between the table wings is provided with leveling means to level said disposable wooden table section flat with the upper surface of the table wings.

3. The machine tool table of claim 1 wherein the space between the table wings is provided with adjusting means to adjust the width of the space for said disposable wooden table section whereby the space for said disposable wooden table section can be adjusted to loosely accommodate varying dimensions of said disposable wooden table section.

4. In a drill press table of the type comprising a flat surface made entirely of cast metal, the improvement comprising:
   a groove in the surface of said table positioned generally under the cutting tool;
   a disposable wooden table section dimensioned to slide into said groove, said disposable wooden table section being unattached so that it is freely moveable by an operator, comprised of common lumber, positioned loosely upon said table within said groove in the surface of said table whereby said groove can thereby counteract the rotary forces of a tool upon said disposable wooden table section while permitting the disposable table section to be easily moved or replaced by an operator as needed to compensate for wear and use of different tools upon the table section.

5. The drill press table of claim 4 wherein the space between the table wings is provided with leveling means to level said disposable wooden table section flat with the upper surface of the table wings.

6. The drill press table of claim 4 wherein the space between the table wings is provided with adjusting means to adjust the width of the space for said disposable wooden table section whereby the space for said disposable wooden table section can be adjusted to loosely accommodate varying dimensions of said disposable wooden table section.

7. A drill press table, comprising:
   a supporting structure;
   a first table wing;
   a second table wing;
   a disposable wooden table section, said disposable wooden table section being unattached so that it is freely moveable by an operator, comprised of common lumber; and
   attaching means for attaching said first table wing and said second table wing upon said supporting structure so spaced to allow said disposable wooden table section to be positioned loosely upon said supporting structure between the table wings whereby the table wings can thereby counteract the rotary forces of a tool upon said disposable wooden table section while permitting the disposable table section to be easily moved or replaced by an operator as needed to compensate for wear and use of different tools upon the table section.

8. The drill press table of claim 7 wherein the space between the table wings is provided with leveling means to level said disposable wooden table section flat with the upper surface of the table wings.

9. The drill press table of claim 7 wherein the space between the table wings is provided with adjusting means to adjust the width of the space for said disposable wooden table section whereby the space for said disposable wooden table section can be adjusted to loosely accommodate varying dimensions of said disposable wooden table section.

* * * * *